Figure 1:
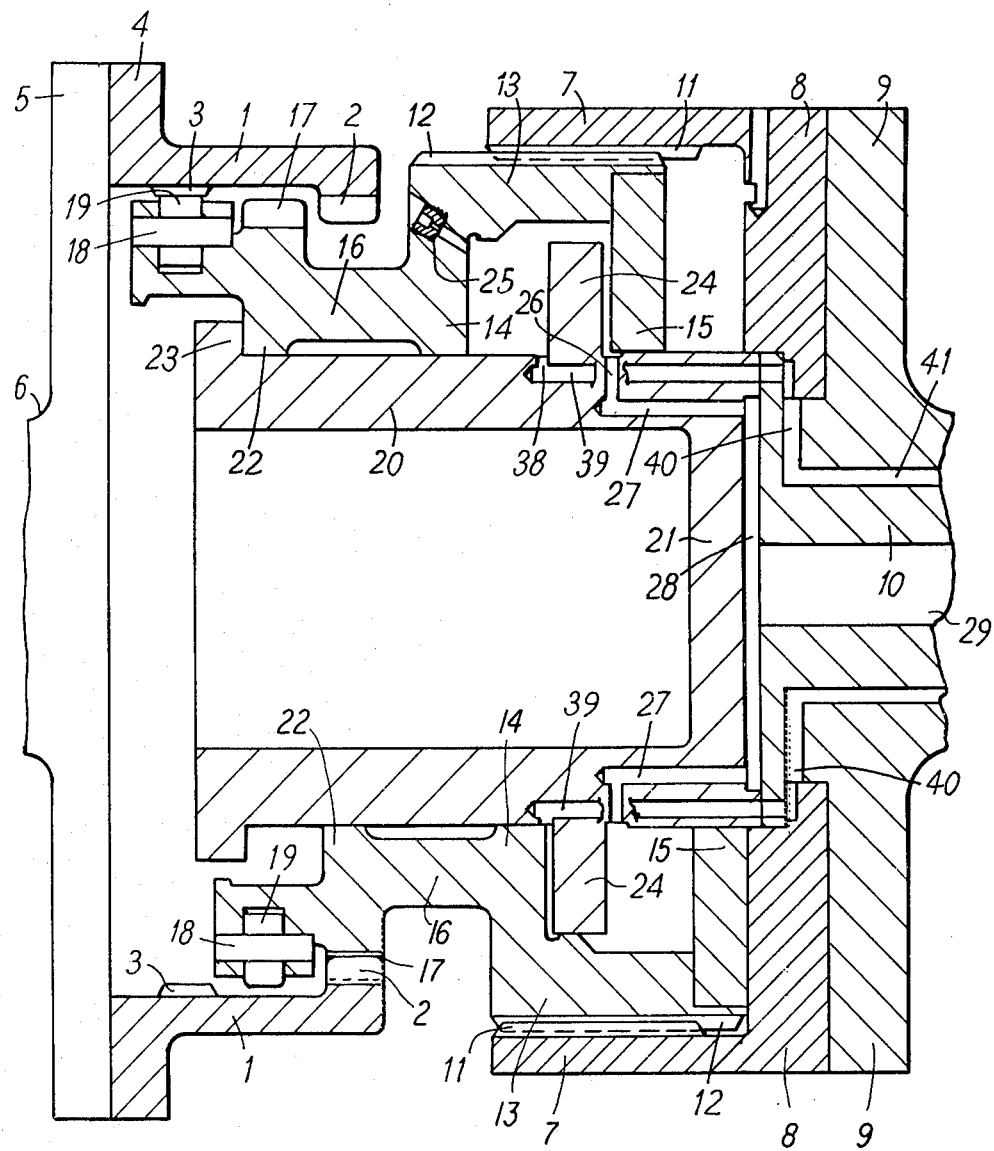

United States Patent [19]

Clements et al.

[11] 4,055,240

[45] Oct. 25, 1977

[54] FLUID OPERATED TOOTHED CLUTCH WITH DASHPOT

[75] Inventors: Herbert Arthur Clements, Weybridge; Robert Howard Heybourne, East Molesey, both of England

[73] Assignee: S.S.S. Patents Limited, London, England

[21] Appl. No.: 650,462

[22] Filed: Jan. 19, 1976

[30] Foreign Application Priority Data

Jan. 21, 1975 United Kingdom ................ 2622/75

[51] Int. Cl.² ............................................ F16D 23/02
[52] U.S. Cl. .................................... 192/67 A; 192/86; 192/109 D
[58] Field of Search ................ 192/86, 67 A, 109 D

[56] References Cited

U.S. PATENT DOCUMENTS

| 2,489,258 | 11/1949 | Bebinger et al. | 192/86 |
| 2,710,086 | 6/1955 | Stahl | 192/86 X |
| 3,395,782 | 8/1968 | Clements | 192/67 A |
| 3,402,794 | 9/1968 | Sinclair et al. | 192/67 A |
| 3,441,117 | 4/1969 | McNamara | 192/86 X |
| 3,904,006 | 9/1975 | Clements | 192/109 D |

Primary Examiner—Benjamin W. Wyche
Attorney, Agent, or Firm—Woodcock, Washburn, Kurtz & Mackiewicz

[57] ABSTRACT

A toothed clutch of the type having a hydraulic dashpot to which liquid is fed to cushion the final phase of clutch engagement and to establish a holding pressure for resisting disengagement of the clutch.

In accordance with the invention, means are provided for establishing, when required, a fluid pressure opposing the said holding pressure, so as to facilitate disengagement of the clutch without interrupting the feeding of fluid to the dashpot.

1 Claim, 2 Drawing Figures

FLUID OPERATED TOOTHED CLUTCH WITH DASHPOT

This invention relates to self-engaging toothed clutches, and particularly but not exclusively to synchronous self-shifting toothed clutches of the type comprising first and second rotary clutch parts and clutch-actuating mechanism operative upon passage of the said rotary clutch parts through synchronism in one direction of relative rotation, the said mechanism including an intermediate member which is constrained for movement relative to one of the said rotary clutch parts in the requisite direction to initiate interengagement of the coacting clutch teeth.

British patent specification No. 1,408,315 discloses a toothed clutch provided with a hydraulic dashpot comprising a cylinder and a piston, wherein first fluid supply means are provided for enabling fluid to be fed to the dashpot cylinder on one side of the piston to effect cushioning of the final phase of clutch engagement, and wherein second fluid supply means are provided for enabling fluid to be fed to the dashpot cylinder on the other side of the piston in order to resist disengagement of the interengaged clutch teeth with the object of holding the clutch in the engaged condition.

In the clutch described in British patent specification No. 1,408,315 means are provided for permitting leakage from the dashpot cylinder of fluid that is holding the clutch in the engaged condition, such that when the clutch is to be disengaged and for this purpose the supply of fluid for holding the clutch in the engaged condition is discontinued, the fluid pressure that is holding the clutch in the engaged condition is relieved by the said leakage of fluid. Means are also provided whereby as the clutch approaches the fully engaged condition the supply of fluid to the cylinder for cushioning the final phase of clutch engagement is cut off, and means are also provided for permitting leakage of cushioning fluid from the dashpot cylinder. Hence, when the clutch is fully engaged there is substantially no fluid pressure on what may be termed the cushioning side of the piston. When the clutch becomes disengaged there is a time lag in the buildingup of fluid pressure on the cushioning side of the piston, hence if full or partial disengagement of the clutch is quickly followed by re-engagement, such re-engagement will take place with little or no cushioning. The object of the present invention is to overcome this problem.

In accordance with the present invention, in a self-engaging toothed clutch provided with a hydraulic dashpot to hich can be fed fluid by which the final phase of clutch engagement is cushioned and by which disengagement of the clutch is resisted by a holding pressure, means are provided which are operable when required to establish fluid pressure which opposes the holding fluid pressure, whereby to facilitate disengagement of the clutch without interrupting the feeding of fluid to the dashpot.

Figure 2:
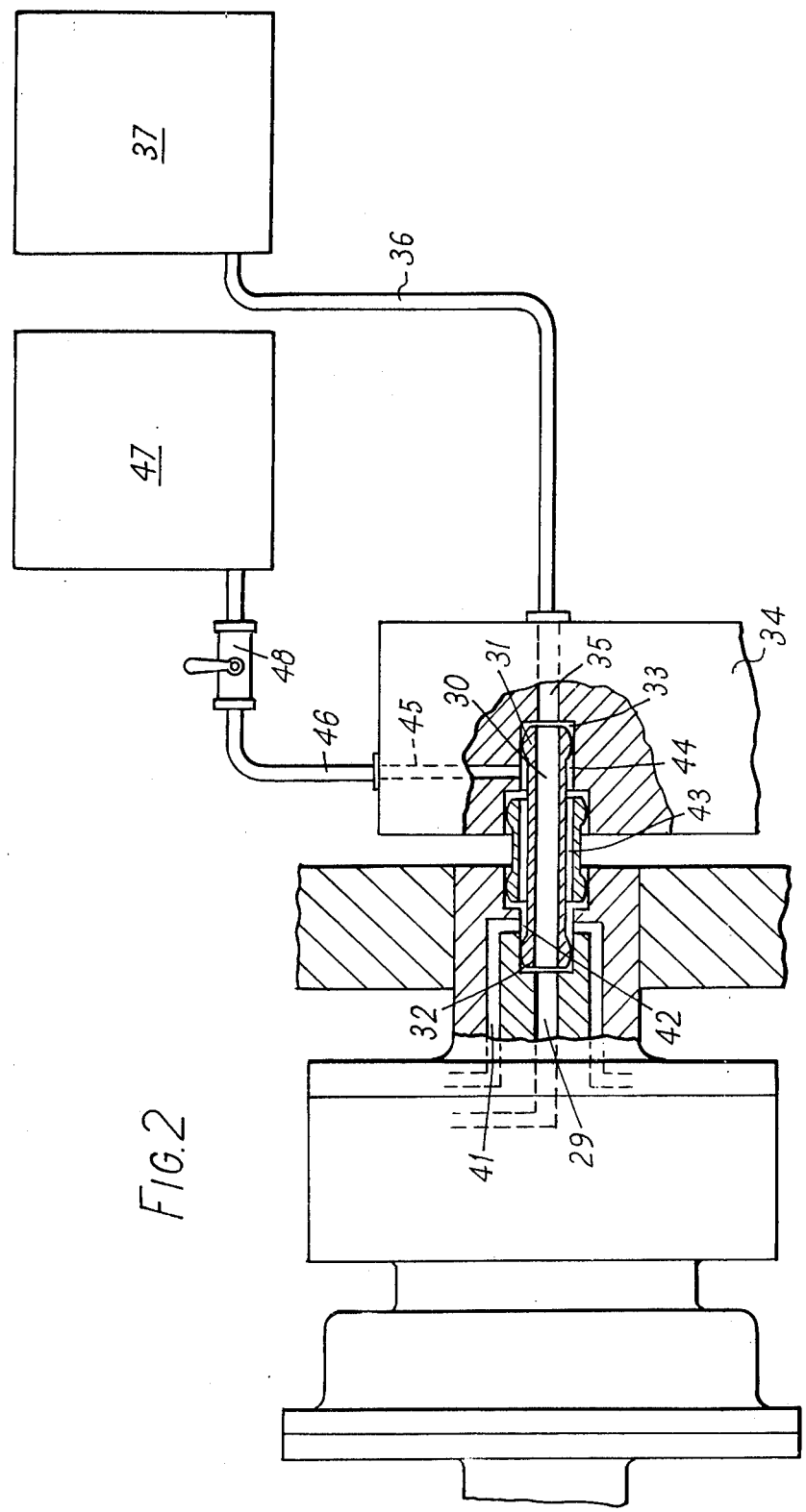

A synchronous self-shifting toothed clutch embodying the invention is illustrated in the accompanying drawings, in which:

FIG. 1 is a view in longitudinal section on the axis of the clutch, the upper half of the Figure showing the clutch in a disengaged condition and the lower half of the Figure showing the clutch in an engaged condition, and FIG. 2 is a view partly in section showing part of the clutch, fluid supply ducts and associated sources of fluid under pressure.

Referring to the drawings, the first rotary clutch part includes a sleeve 1 which is formed with a ring of internal clutch teeth 2, a ring of internal ratchet teeth 3, and a flange 4 which is drivably coupled to a flange 5 integral with a shaft 6. The second rotary clutch part includes a sleeve 7 which is carried at the outer periphery of a ring 8 drivably coupled to a flange 9 integral with a shaft 10. The sleeve 7 is formed with internal right-hand helical splines 11, with which are engaged external helical splines 12 on a sleeve 13 which is intergral with a ring 14 and with a sleeve 16. The parts 13, 14, 16 together an end ring 15 constitute the intermediate member of the clutch. The sleeve 16 carries a ring of external clutch teeth 17, and pawl pins 18 on which are mounted pawls 19. Viewed from the left-hand end of the clutch in FIG. 1, the noses of the pawls 19 point in anti-clockwise direction. The intermediate member is slidable on a sleeve 20 which has an end plate 21 which is rotatable with the second rotary clutch part 7. In the disengaged condition of the clutch, shown in the upper half of FIG. 1, an internal flange 22 on the sleeve 16 is against an annular axial stop 23 on the sleeve 20.

The parts 13, 14 and 15 of the intermediate member together form an annular dashpot cylinder, into which projects an annular piston constituted by a radially outwardly projecting flange 24 on the sleeve 20. The internal shape of the dashpot cylinder is such that when the piston 24 is adjacent the right-hand end of the cylinder as in the upper half of FIG. 1, there is considerable cleanance around the piston so that fluid in the dashpot cylinder can pass relatively freely from one side of the piston to the other side thereof, whereas when the piston is adjacent the left-hand end of the cylinder there is a close sliding clearance between the outer surface of the piston and the cylinder bore such that apart from leakage fluid cannot pass from one side of the piston to the other side thereof. This condition is illustrated in the lower half of FIG. 1. A restricted leak-off nozzle 25 is provided in the ring 14, viz, at the left-hand end of the dashpot cylinder.

In the disengaged condition of the clutch there is a gap between the right-hand face of the piston 24 and the left-hand face of the ring 15. Radial feed ducts 26 that open into the gap communicate with supply ducts 27, 28 and 29. Referring to FIG. 2, the supply duct 29 communicates with an axial duct 30 in a sealing member 31 located partly in a chamber 32 formed in the end of shaft 10 and partly in a chamber 33 formed in a stationary member 34. The duct 30 communicates with a duct 35 in the stationary member 34, and the duct 35 communicates via a pipe 36 with a source 37 of oil under pressure.

In the disengaged condition of the clutch, shown in the upper half of FIG. 1, radial feed ducts 38 open into the dashpot cylinder adjacent the left-hand side of the piston 24. The feed ducts 38 communicate with supply ducts 39, 40 and 41, as shown in FIG. 2. The duct 41 communicates with an annular groove 42 in the sealing member 31, and the groove 42 communicates via axial ducts 43 in the sealing member 31 with an annular groove 44 in the sealing member 31. The groove 44 communicates via a duct 45 and a pipe 46 with a source 47 of oil under pressure. In the pipe 46 there is provided an on-off valve 48 which can be selectively actuated to open or close communication between the source 47 and the pipe 46.

The operation is as follows. In the disengaged condition of the clutch (upper half of FIG. 1) the external clutch teeth 17 are to the left of the internal clutch teeth 2, the pawls 19 are located for cooperation with the ratchet teeth 3, and the flange 22 of the intermediate member is against the axial stop 23. Assuming that the shaft 10 is stationary and that the shaft 6 is rotating in the anti-clockwise direction as viewed from the left-hand end of FIG. 1, the ratchet teeth 3 ratchet relative to the pawls 19. When the shaft 10 is accelerated in the same direction of rotation as the shaft 6, and tends to overrun the shaft 6, pawls 19 engage ratchet teeth 3, and under the action of the interengaged helical splines 11 and 12 the intermediate member 13–16 is shifted helically to the right relative to the sleeve 7, thereby bringing the external clutch teeth 17 into precise initial interengagement with the internal clutch teeth 2. Thereupon the interaction of the partially interengaged clutch teeth 2 and 17 draws the intermediate member into full toothed engagement with the sleeve 1, the intermediate member coming against an axial stop consitituted by the left-hand face of the ring 8. The clutch is now in the engaged condition shown in the lower half of FIG. 1.

Whilst the clutch is in a disengaged condition, the valve 48 is kept closed, so that no oil is supplied to the radial feed ducts 38. However, oil flows continuously from the source 37 to the radial feed ducts 26 into the dashpot cylinder. Owing to the relatively wide clearance between the piston 24 and the bore of the dashpot cylinder, oil flows relatively freely around the piston 24 from the right-hand side thereof to the left-hand side thereof, so that the dashpot cyliner becomes filled with oil on both sides of the piston 24, the rate at which oil is supplied from the source 37 being greater than the rate at which oil can leak away through the restricted nozzle 25. During the initial part of the movement of the intermediate member in the direction for clutch engagement, the relatively free passage of oil around the piston 24 means that little resistance is offered to the movement of the intermediate member. However, during the final part of the movement of the intermediate member in the direction for clutch engagement the piston 24 moves into the part of the cylinder bore where there is close clearance between the piston and the cylinder bore, hence the transfer of oil from the left-hand side of the piston 24 to the right-hand side thereof is restricted, and the oil on the left-hand side of the piston is trapped in a substantially closed chamber from which oil can leak away only slowly through the restricted leak-off nozzle 25 and through the abovementioned close clearance. The final part of the movement of the intermediate member in the direction for clutch engagement is therefore cushioned.

When the clutch is in a fully engaged condition, as shown in the lower half of FIG. 1, the oil on the right-hand side of the piston 24 is also trapped in a substantially closed chamber any leakage from which is replenished from the source 37. The clutch is threfore held in the engaged conditon by the pressure of oil on the right-hand face of the piston 24 and on the left-hand face of the ring 15.

When the clutch is required to disengage, as by the retardation of the shaft 6, the valve 48 is opened to establish communication between the source 47 of oil under pressure and the radial feed ducts 38. Oil under pressure is thereby fed to the dashpot cylinder on the left-hand side of the piston 24, at a higher rate than the rate of leakage through the restricted leak-off nozzle 25. The oil pressure that becomes established on the left-hand side of the piston 24 may be arranged to be substantially equal to or higher than the oil pressure that obtains on the right-hand face of the piston, so that when the shaft 10 is retarded the intermediate member 13, 14, 15, 16 can move relatively freely to the left under the conjoint action of the interengaged clutch teeth 2 and 17 and the interengaged helical splines 11 and 12, thereby disengaging the external clutch teeth 17 from the internal clutch teeth 2, the movement of the intermediate member being limited by the axial stop 23. When the clutch has fully disengaged, the valve 48 is closed so as to cut off the supply of oil to the left-hand side of the piston. However, oil under pressure continues to be supplied to the right-hand side of the piston 24 from the source 37, at a rate faster than the rate at which oil can flow away through the nozzle 25 and port 38, and as soon as the intermediate member has attained a position in which there is wide clearance between the piston 24 and the bore of the dashpot cylinder, oil flows relatively freely around the piston from the right-hand side thereof to the left-hand side thereof. Therefore, it disengagement of the clutch is quickly followed by re-engagement, the final part of the movement of the intermediate member in the direction for clutch engagement is cushioned.

We claim:

1. A toothed clutch of the self-engaging type that includes a hydraulic dashpot comprising a dashpot cylinder and a piston movable therein, for cushioning the final phase of clutch engagement, and duct system via which fluid under pressure can be fed to the dashpot cylinder whereby in the disengaged condition of the clutch to provide cushioning fluid in the dashpot cylinder on one side of the piston and in the engaged condition of the clutch to establish in the dashpot cyliner on the other side of the piston a holding pressure that resists clutch self-disengagement, the invention compising a duct system which is independent of said first-mentioned duct system and via which in the engaged condition of the clutch fluid under pressure can be fed when required to the dashpot cylinder on the said one side of the piston to establish a fluid pressure that opposes said holding pressure whereby to facilitate the self-disengagement of the clutch without interruption of the supply of fluid to the dashpot cylinder via said first-mentioned duct system.

* * * * *